Patented Aug. 22, 1944

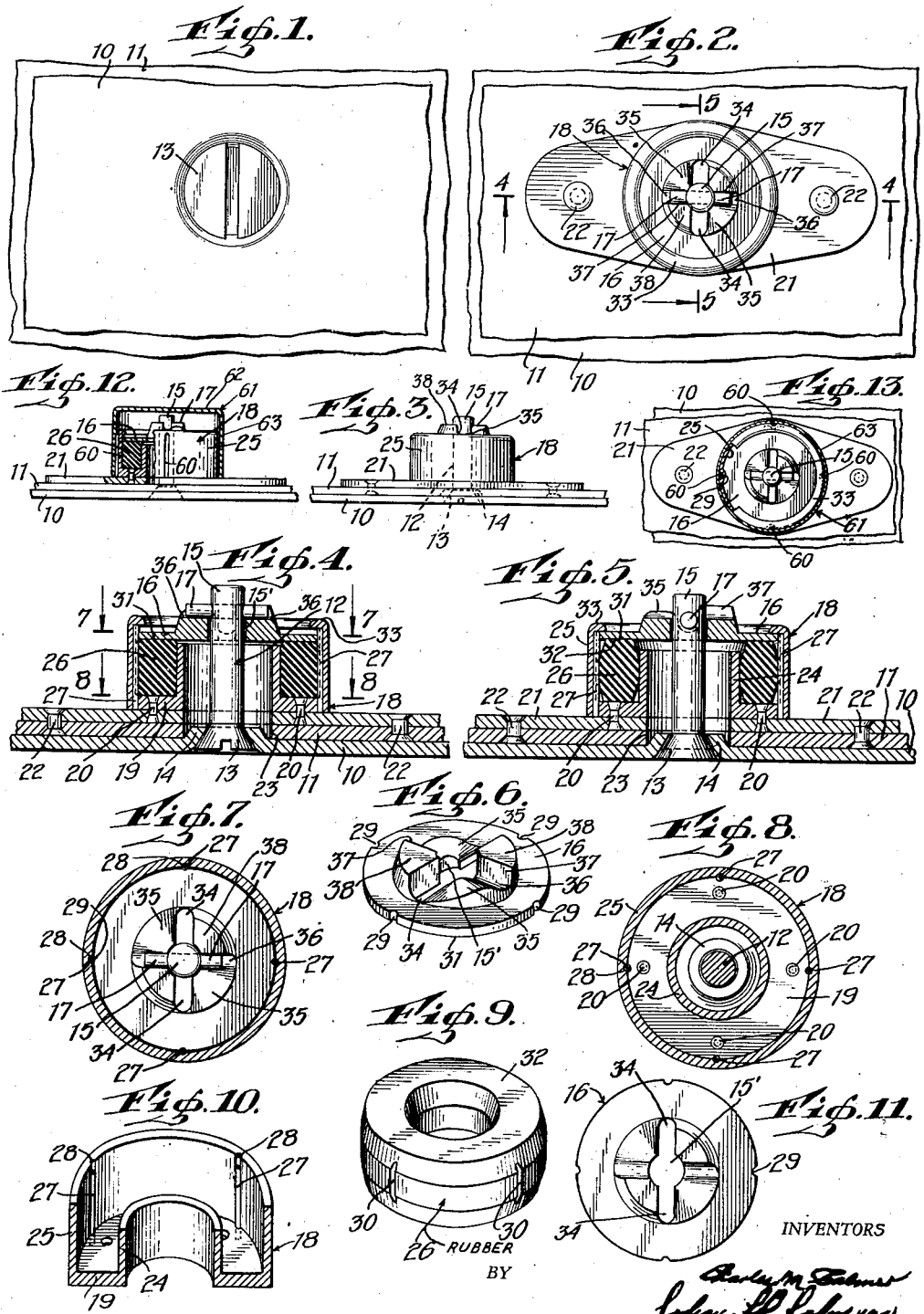

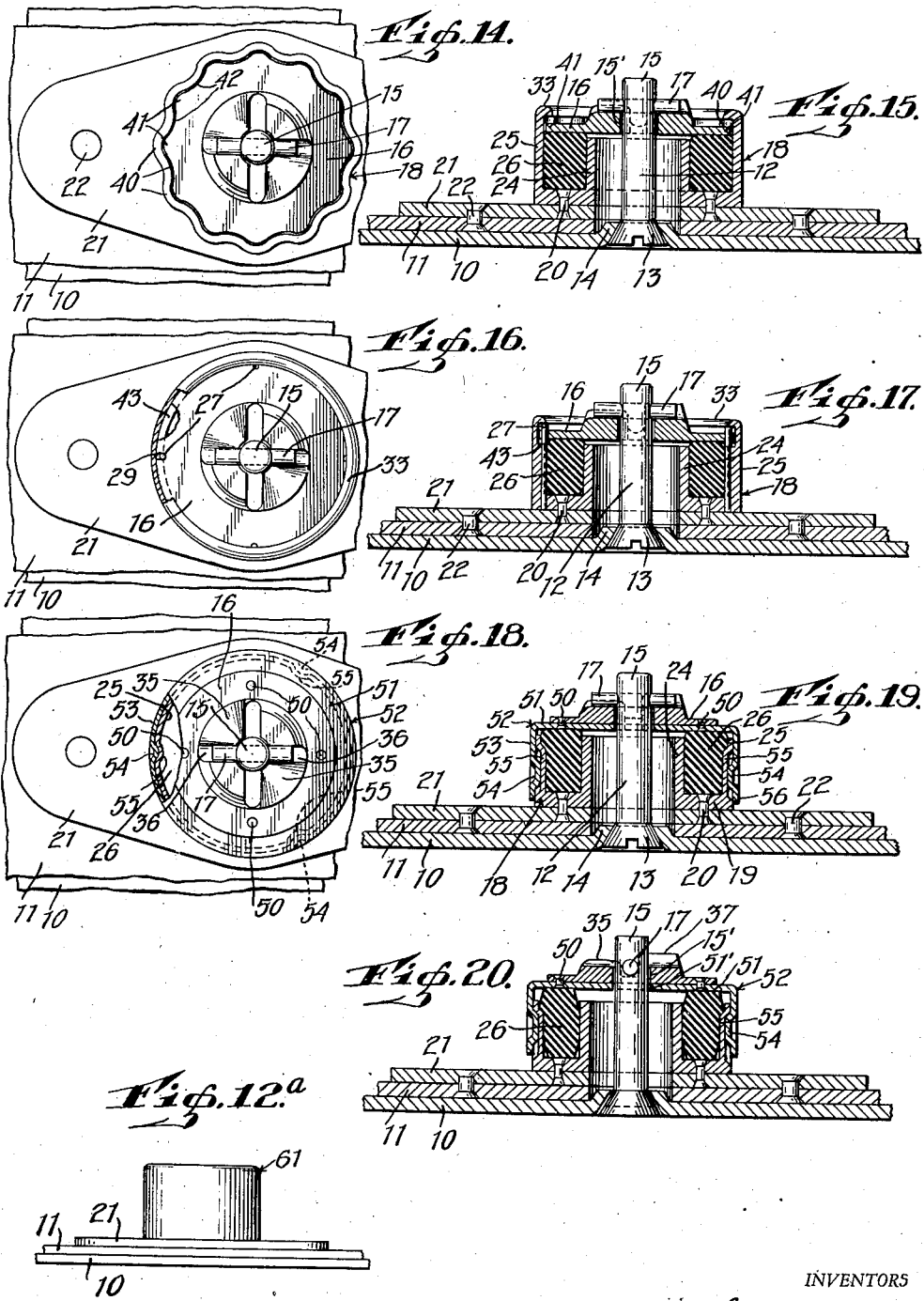

2,356,162

UNITED STATES PATENT OFFICE 2,356,162

COWL FASTENER

Johan H. Johnson, New York, N. Y., and Charles M. Palmer, Washington, D. C.

Application June 14, 1943, Serial No. 490,782

20 Claims. (Cl. 24—221)

The subject matter of this invention is a cowl fastener adapted for aeronautical use although not limited thereto. The object of the invention is to provide a novel and serviceable cowl fastener adapted for heavy and light duty performance in the matter of desirably removably holding juxtapositioned members or plates closely together. A further object of the invention resides in the provision of a reliably operating cowl fastener wherein a slidably guided floating keeper is mounted on a rubber bumper confined within a shell or casing fastened to a platform adapted to be conveniently mounted on an inside face of a plate or member of an aeronautical device. Another object of the invention is realized in the provision of stop means for limiting the downward deflection of the bumper which characterizes spring means to resist downwardly displacement of the floating keeper. Another object of the invention is concerned with keyed means to permit rectilinear displacement and prevent rotational displacement of the keeper relative to the shell or casing. Further objects are realized in the provision of an annular casing for confining a relatively durable annular rubber bumper of adequate width and height to normally sustain the non-rotatably guided keeper against a peripheral stop of the casing when the keeper is in an unlocked relation with the stud or when the stud has been withdrawn from the casing; the provision of a retaining wall on the casing to prevent buckling of the rubber bumper and to preclude lateral slippage thereof out of the casing; the provision of a notched keeper cooperating with key means carried by the casing for slidably but non-rotatably guiding the keeper against the resistance offered by the bumper upon actuation of the rotatable locking bolt; the provision of complementary telescopically associated casings one of which carries the bumper means and the other characterizes a cap fixedly carrying keeper means cooperating with a rotatable stud to shift the cap bodily against the resistance of the bumper means; the provision of means for slidably but non-rotatably guiding the keeper carrying cap. Another object resides in the utilization of a platform to which the bumper carrying casing is mounted for facilitating assembly of the herein disclosed fastener to an inside plate of an aeronautical device. A further object has to do with the provision of a closure for shielding the cowl fastener. Other objects, features, and functional and structural advantages of the invention will be more readily appreciated from the following detailed description considered in the light of the accompanying drawings wherein:

Fig. 1 is a front view of a pair of plates of an aeronautical device desirably held together by the cowl fastener according to our invention, the head of the locking bolt or stud of the fastener being shown with its tool receiving slot disposed vertically in which position the stud may be considered as locked to prevent separation of the plates.

Fig. 2 is an inside plan view of Fig. 1 illustrating the locking pin of the stud interlocked with alined grooves of the slidably but non-rotatably guided keeper.

Fig. 3 is a fragmentary side elevational view of Fig. 2.

Fig. 4 is a longitudinal sectional view on the line 4—4 of Fig. 2.

Fig. 5 is a transverse sectional view on the line 5—5 of Fig. 2, however illustrating the stud or bolt unlocked from the keeper.

Fig. 6 is a perspective view of the slidable but non-rotatably guided notched keeper.

Figs. 7 and 8 are sectional views on the lines 7—7, and 8—8 respectively of Fig. 4.

Fig. 9 is a perspective view of the rubber bumper or annular elastic tumbler.

Fig. 10 is a fragmentary view in perspective of the cylindrical shell or casing.

Fig. 11 is a plan view of the keeper.

Fig. 12 is a view similar to Fig. 3 illustrating another embodiment of the invention, partly in section and partly broken away.

Fig. 12a may be considered as an elevational view of Fig. 12 or an elevational view of the other embodiments herein illustrated where a shielding closure is mounted on the bumper containing casing.

Fig. 13 is a plan view of Fig. 12, partly in section and partly broken away.

Fig. 14 is a plan view of another embodiment.

Fig. 15 is a longitudinal sectional view of Fig. 14.

Fig. 16 is a plan view of another form of the invention.

Fig. 17 is a longitudinal section of Fig. 16.

Fig. 18 is a plan view of a further embodiment of the invention, illustrated partly broken away and in section.

Fig. 19 is a longitudinal sectional view of Fig. 18 however illustrating the rotatable stud or bolt locked to the keeper in which instance the bumper is compressed, and Fig. 20 is a view similar to Fig. 19 showing the stud unlocked but not withdrawn from the keeper in which instance the bumper is in its normal expanded relation.

In all of the embodiments herein disclosed like reference characters designate corresponding structural features and in the several embodiments, outer and inner plates 10 and 11 are desirably and removably clamped together by the herein disclosed cowl fastener which comprises the usual locking stud or bolt generally designated 12 having its slotted head 13 rotatably guided in the dimple or annular bearing flange 14 on the outer plate 10. Shank 15 of the stud is adapted to removably project into the central and enlarged opening or bearing 15' in the keeper or float 16 and is provided with the fixed transverse locking pin 17 projecting laterally of the shank.

The cowl fastener also embodies the cylindrical shell or annular casing broadly denoted 18 having the lower wall 19 fixed and anchored by rivets 20 to the elongated platform or plate 21 which in turn fastened by rivets 22 to the inside plate 11 provided with a suitable opening 23 in which the annular bearing 14 removably projects.

Integral with and projecting from the bottom wall 19 of the tubular shell or casing 18 are the spaced annular inner and outer walls or flanges 24 and 25 respectively, thus characterizing a trough or channel for receiving the annular rubber bumper or tumbler 26 on which keeper 16 is mounted.

Since during rotation of the locking bolt 12 it is desired to retain the keeper from rotating although permitting rectilinear displacement thereof, keeper 16 is appropriately keyed to the casing. In this connection it will be observed that in the form according to Figs. 1 to 11 inclusive fixed pins 27 retained in the bottom wall 19 and held in position in notches 28 in the outer circumferential wall 25 characterize key means received by notches 29 of the keeper, thus permitting the keeper to be linearly but non-rotatably guided relative to the casing.

Normally the bumper or spring means is expanded as shown in Fig. 5 and is provided with contracted or tapered ends as illustrated. This spring bumper or member is of relatively hard and durable rubber and is confined and retained within the annular channel between the spaced walls 24 and 25 of tubular casing and if desired suitable grooves 30 are provided along its outer surface in which the keys or guides 27 fit, thus preventing any accidental rotation of the bumper relative to the casing.

The keeper 16 has its bottom flat surface 31 (Fig. 5) seated on the upper flat surface 32 of the bumper and is normally even though expanded held against surface 32 under slight pressure by the annular turned over retaining means or spun stop lip 33. By this arrangement, the bumper yieldingly urges the keeper against the stop lip 33 when the stud 12 is unlocked from the keeper.

In the keeper 16, as previously stated, the expanded opening or bearing 15' allows the reception of shank 15 and the contracted openings 34 merging with opening 15' permit the reception of the laterally extending pin 17 of the stud, the opening 15' also constituting a guide bearing for the upper part of the stud 12. Thus opening 15' and the contracted openings 34 define a so called butterfly type of slot to permit the projection of the locking pin of the stud outwardly of the keeper whereby the pin 17 upon rotation of the stud may climb upon the spaced cams 35 forming a part of the keeper to displace the slidably guided keeper inwardly away from the annular stop lip 33 to adequately compress the bumper which is held in such compressed relation upon the reception of the ends of the pin 17 in the alined but spaced grooves 36, and immediately pursuant to reception of the locking pin 17 in grooves 36, stop faces 37 of lugs 38 prevent further rotation of the pin 17 and consequently the locking bolt 12.

Where the bolt 12 is rotated to actuate the keeper against the resistance of the bumper to further compress the latter, deflection of the bumper is limited by reason of the annular retaining wall 24 the upper end of which serves as a stop for the keeper. Hence the bumper can never be compressed below the elevation of the retaining wall stop 24 of the bumper or spring 26. Such limited deflection is desirable in actual practice to comply with governmental tests. Moreover since the upper and lower faces of the bumper are flat and are retained between the lower flat surface of the keeper and the flat surface of annular wall 19, the bumper thus provides ample resistance against accidental compression in case where the stud is unlocked and also provides appreciable clamping action against the keeper when held compressed as in the case where the stud is interlocked with the keeper. By reason of such action plates 10 and 11 cannot be separated from their clamped relation beyond a very negligible predetermined amount. Also by the present arrangement the cowl fastener herein withstands heavy duty and performance without affecting its efficiency.

Where the stud is interlocked with the keeper (Fig. 4) that is, its pin 17 is in the alined grooves 36 thereof, the head of the stud maintains the outer plate 10 against the inner plate 11 as desired. In other words these plates are held clamped together by reason of the retained clamping action of the keeper against the bumper held confined in the shell and in this relation the keeper is spaced from the peripheral stop lip 33 while the bottom flat face 31 of the keeper 16 is slightly spaced from the inside wall 24.

The outward retractive pressure imparted by the bumper against the keeper is fairly great when the stud is interlocked with the keeper. Hence the keeper more firmly coacts with the cross pin 17 tending to shift the latter away from the keeper but such shifting is resisted in that head 13 of the stud urges the outer plate 10 against the inner plate 11 and with proportionate greater intensity.

The retaining wall 24 of the casing characterizes means to confine the bumper within the casing and also constitutes means to prevent buckling thereof or accidental removal from the annular channel between the spaced cylindrical walls 24 and 25.

In Fig. 4, the stud is interlocked with the keeper and consequently plates 10 and 11 are desirably clamped together under appreciable pressure imparted by the compressed relatively heavy duty bumper. To unlock the keeper, the bolt is rotated upon insertion of a suitable tool in the head 13, thus shifting the cross pin out of the alined grooves 36 of the keeper, over the cams 35 and into contracted openings 34. By this action, the bumper releases or retracts, and assumes its normal expanded condition (Fig. 5). Consequently the keeper is urged firmly but removably against the stop lip 33. Such action also unclamps plates 10 and 11. Moreover, the shank 15 and its cross pin 17 may now be moved into and from the casing 18 whereby plate 10 may be disengaged from plate 11.

According to the form illustrated in Figs. 12 and 13, pins or keys 27 of Figs. 4 and 5 have been eliminated and instead other key means in the form of a plurality of vertical ribs 60 have been pressed into the outer cylindrical rim or wall 25. These ribs 60 project into the spaced peripheral notches 29 in the keeper 16. By reason of such construction the keeper is prevented from rotation but is linearly guided within the casing 18. Moreover a one piece cylindrical cap 61 having a top wall 62 provided with a depending skirt 63 defines a closure or seal for the fastener. This cap may be frictionally but removably secured to casing 18 or may be fixed thereto in any well known manner. In other aspects the form shown in Figs. 12 and 13 is along the lines of the embodiment illustrated in Figs. 4 and 5.

In Figs. 14 and 15, linear but non-rotational displacement of the keeper 16 takes place by reason of the plurality of hollow ribs or keys 40 of the casing 18 cooperating with the undulatory periphery defining guides in the form of ribs 41 and concavities 42 in the keeper 16. In other aspects the embodiment of Figs. 14 and 15 is along the lines of the form illustrated in Figs. 1–13.

In the form according to Figs. 16 and 17 the upper portion of cylindrical wall or rim 25 is attenuated to provide an annular shoulder 43 in alinement with the upper stop surface of the inner annular wall or rim 24 to form supplementary stop means for the keeper 16. Otherwise the embodiment of Figs. 16 and 17 is along the lines of Figs. 1 to 13.

In Figs. 18 and 19, the keeper also is held buoyant, as in the other embodiments disclosed, although fixed by rivets 50 to the flat top wall 51 of the cylindrical cap 52 having its depending cylindrical skirt or flange 53 desirably indented to provide the spaced rectilinear ribs or keys 54 slidably interlocking with corresponding spaced and rectilinear ribs 55 indented in casing or shell 18. By reason of this construction the keeper 16 is slidably guided but non-rotatably guided on the inner casing 18 although shank 15 removably projects through central opening 51' in the top wall 51 of the cap 52 which is seated on the annular bumper of the type disclosed in connection with the aforementioned embodiments. In Figs. 19 and 20 the upper portion of the cylindrical wall or rim 24 likewise constitutes stop means to limit deflection of the bumper, and should the wall 51 engage the rim 24, the lower margin 56 of the cylindrical skirt 53 of the cap would at such time engage the platform 21. Thus the latter also constitutes means to limit the deflection of the bumper or tumbler 26 since it restricts downward displacement of cap 52.

In Fig. 12ᵃ a shielding cap 61 is mounted over the bumper carrying casing and such type of cap may be utilized in connection with all of the embodiments herein disclosed.

In actual practice the keeper and locking stud and its pin are of a suitable hardened steel while the plates, rivets, casing, and closure caps are of aluminum. However if desired these parts may be made of a suitable plastic material or of any other appropriate composition. The rubber bumper or tumbler 26 however is relatively hard to withstand the stresses imparted thereto by the floating keeper means on all the forms disclosed and of course the keeper 16 in Fig. 19 may be integral with the cap 52 and for purposes of specification the latter may be considered as keeper means held buoyant by the bumper.

Various changes may be made in details of construction and arrangement of parts without departing from the spirit of the invention or sacrificing any of the advantages inherent therein.

We claim:

1. A fastener for removably clamping together an outer plate having bearing means and an inner plate comprising; a casing secured to said inner plate, a rubber member within said casing, keeper means on said member, means slidably and rectilinearly guiding displacement of said keeper means relative to said casing, a bolt having a head rotatably mounted in said bearing means and a shank removably projectible into and through said casing, rubber member and keeper means, and a cross pin mounted on said shank to disengageably interlock with said keeper means upon rotation of said bolt relative to said plates and to actuate said keeper means in a direction towards said member to compress the latter.

2. A fastener for removably clamping together an outer plate having bearing means and an inner plate comprising; a casing secured to said inner plate, a rubber bumper within said casing, keeper means, means slidably and rectilinearly guiding displacement of said keeper means relative to said casing, a bolt having a head rotatably mounted in said bearing means and a shank removably projectible into and through said casing and keeper means, and a cross pin mounted on said shank to disengageably interlock with said keeper means upon rotation of said bolt relative to said plates and to actuate said keeper means in a direction towards said bumper to compress the latter.

3. A fastener for removably clamping together an outer plate having bearing means and an inner plate comprising; a casing secured to said inner plate including spaced walls, a hollow rubber bumper confined between said walls and projecting beyond one of said walls, keeper means mounted on said bumper and having an elongated slot, means slidably and rectilinearly guiding displacement of said keeper means relative to said casing, a rotatable bolt having a head movably guided in said bearing means and a shank removably projectible into and through said casing, bumper and slot, and a cross pin mounted on said shank to disengageably interlock with said keeper means upon rotation of said bolt relative to said plates and to actuate said keeper means in a direction towards said bumper to compress the latter.

4. A fastener for removably clamping together an outer plate having bearing means and an inner plate comprising; an annular hollow casing secured to said inner plate, a substantially annular rubber bumper closely confined within said casing, keeper means, means slidably and rectilinearly guiding displacement of said keeper means relative to said casing, a bolt having a head rotatably mounted in said bearing means and a shank removably projectible into and through said casing and keeper means, and a cross pin mounted on said shank to disengageably interlock with said keeper means upon rotation of said bolt relative to said plates and to actuate said keeper means in a direction towards said bumper to compress the latter.

5. A fastener for removably clamping together an outer plate having bearing means and an inner plate comprising; a casing secured to said inner plate and having spaced inner and outer rims, a resilient rubber bumper interposed between said rims and normally extending beyond said inner rim, displaceable keeper means mounted on said bumper, key means rectilinearly guiding displacement of said keeper means relative to said casing, a bolt having a head rotatably mounted in said bearing means and a shank removably projectible into and through said casing and keeper means, and a cross pin mounted on said shank to disengageably interlock with said keeper means upon rotation of said bolt relative to said plates and to actuate said keeper means in a direction towards said bumper to compress the latter.

6. A fastener for removably clamping together an outer plate having bearing means and an inner plate comprising; a casing secured to said inner plate and having spaced inner and outer rims, a normally expanded rubber bumper interposed between said rims and normally extending beyond said inner rim, displaceable keeper means mounted on said bumper, key means rectilinearly guiding displacement of said keeper means relative to said casing, a bolt having a head rotatably mounted in said bearing means and a shank removably projectible into and through said casing and keeper means, and a cross pin mounted on said shank to disengageably interlock with said keeper means upon rotation of said bolt relative to said plates and to actuate said keeper means in a direction towards said bumper to compress the latter, said inner rim characterizing stop means to limit displacement of said keeper means towards said bumper and to limit compression of the latter by said keeper means.

7. A fastener for removably clamping together an outer plate having bearing means and an inner plate comprising; a casing secured to said inner plate and having spaced inner and outer rims, a hollow rubber bumper interposed between said rims and normally extending beyond said inner rim, displaceable keeper means seated on said bumper and having guide means and cam means, key means extending from said outer rim and cooperating with said guide means for rectilinearly guiding displacement of said keeper means relative to said casing, a bolt having a head rotatably mounted in said bearing means and a shank removably projectible into and through said casing, bumper and keeper means, a cross pin mounted on said shank to disengageably interlock with said keeper means upon rotation of said bolt relative to said plates and cooperating with said cam means to actuate said keeper means in a direction towards said bumper to compress the latter.

8. A fastener for removably clamping together an outer plate having bearing means and an inner plate comprising; a casing secured to said inner plate and having spaced inner and outer rims, a rubber bumper confined between said rims and having a tapered end normally extending beyond said inner rim, displaceable keeper means seated on said end and including cam means, means rectilinearly guiding displacement of said keeper means relative to said casing, a bolt having a head rotatably mounted in said bearing means and a shank removably projectible into and through said casing and keeper means, and a cross pin mounted on said shank to disengageably interlock with said keeper means upon rotation of said bolt relative to said plates and to operate against said cam means to actuate said keeper means in a direction towards said bumper to compress the latter.

9. A fastener for removably clamping together an outer plate having bearing means and an inner plate comprising; spaced inner and outer rims, a hollow rubber bumper interposed between said rims, a keeper mounted on said bumper and having cam means and an elongated slot, means for rectilinearly guiding displacement of said keeper relative to said rims, a bolt rotatably guided in said bearing means and having a shank removably projectible into and through said inner rim and elongated slot, and a cross pin mounted on said shank to disengageably interlock with said keeper upon rotation of said bolt relative to said plates and to actuate said cam means for displacing said keeper in a direction towards said bumper to compress the latter.

10. A fastener for removably clamping together an outer plate having bearing means and an inner plate comprising; spaced inner and outer curved rims, a hollow and curved rubber bumper interposed between said rims and having a contracted end extending beyond said inner rim, a keeper mounted on said end and having cam means and an elongated slot, means for rectilinearly guiding displacement of said keeper relative to said rims, a bolt rotatably guided in said bearing means and having a shank removably projectible into and through said inner rim and elongated slot, and a cross pin mounted on said shank to disengageably interlock with said keeper upon rotation of said bolt relative to said plates and to actuate said cam means for displacing said keeper in a direction towards said bumper to compress the latter.

11. A fastener for removably clamping together an outer plate having bearing means and an inner plate comprising; spaced inner and outer rims defining a channel, a hollow rubber bumper interposed between said rims and in part confined in said channel and extending beyond said inner rim, a keeper mounted on said bumper and mounted within said outer rim and having cam means and an elongated slot, means for rectilinearly guiding displacement of said keeper relative to said rims, a bolt rotatably guided in said bearing means and having a shank removably projectible into and through said inner rim and elongated slot, and a cross pin mounted on said shank to disengagably interlock with said keeper upon rotation of said bolt relative to said plates and to actuate said cam means for displacing said keeper in a direction towards said bumper to compress the latter.

12. A fastener for removably clamping together an outer plate having bearing means and an inner plate comprising; substantially annular spaced inner and outer rims, a substantially annular rubber bumper interposed between said rims and extending beyond one of said rims, a keeper mounted on said bumper and having cam means and an elongated slot, means for non-rotatably and slidably guiding displacement of said keeper relative to said rims, a bolt rotatably guided in said bearing means and having a shank removably projectible into and through said inner rim and elongated slot, and a cross pin mounted on said shank to disengageably interlock with said keeper upon rotation of said bolt relative to said plates and to actuate said cam means for displacing said keeper in a direction towards said bumper to compress the latter, means to limit compression of said bumper, and means to limit displacement of said keeper in a direction away from said bumper upon expansion of the latter pursuant to disengagement of said pin from said keeper means.

13. A fastener for removably clamping together an outer plate having bearing means and an inner plate comprising; a casing including spaced inner and outer rims and supporting means interposed between said rims, a hollow rubber bumper disposed between said rims and seated on said supporting means, a keeper mounted on said bumper and having cam means and an elongated slot, means for rectilinearly guiding displacement of said keeper relative to said rims, a bolt rotatably guided in said bearing means and having a shank removably projectible into and through said inner rim and elongated slot, and a cross pin mounted on said shank to disengageably interlock with said keeper upon rotation of said bolt relative to said plates and to actuate said cam means for displacing said keeper in a direction towards said bumper to compress the latter.

14. A fastener for removably clamping together an outer plate having a bearing and an inner plate comprising; a rim disposed substantially normal to said inner plate, a hollow rubber bumper closely surrounding said rim and in part projecting therefrom, a keeper seated on said bumper and including cam means and an elongated slot, a bolt rotatably guided by said bearing and removably projectible within said rim and into and through said slot and having a cross pin cooperating with said cam means to shift said keeper against the resistance of said bumper to compress the latter upon rotation of said bolt to interlock said pin with said keeper, means for slidably and non-rotatably guiding said keeper, stop means to limit displacement of said keeper in a direction towards said bumper, and stop means to limit displacement of said keeper in a direction away from said bumper on expansion of the latter pursuant to unlocking of said pin from said keeper.

15. A fastener for removably clamping together an outer plate having a bearing and an inner plate comprising; a rim secured to said inner plate and provided with guide means, a hollow rubber bumper confined within said rim, a slidably guided keeper seated on said bumper and including cam means and an elongated slot, a bolt rotatably guided by said bearing and removably projectible within said rim and into and through said slot and having a cross pin cooperating with said cam means to shift said keeper against the resistance of said bumper to compress the latter upon rotation of said bolt to interlock said pin with said keeper, means cooperating with said guide means for slidably and non-rotatably guiding said keeper, stop means to limit displacement of said keeper in a direction towards said bumper, and stop means to limit displacement of said keeper in a direction away from said bumper on expansion of the latter pursuant to unlocking of said pin from said keeper.

16. A fastener for removably clamping together an outer plate having a bearing and an inner plate comprising; a rim secured to said inner plate, a hollow rubber bumper confined within and extending above said rim, a keeper seated on said bumper and including cam means and an elongated slot, a bolt rotatably guided by said bearing and removably projectible within said rim and into and through said slot and having a cross pin cooperating with said cam means to shift said keeper against the resistance of said bumper to compress the latter upon rotation of said bolt to interlock said pin with said keeper, means for slidably and non-rotatably guiding said keeper, stop means to limit displacement of said keeper in a direction towards said bumper, and stop means to limit displacement of said keeper in a direction away from said bumper on expansion of the latter pursuant to unlocking of said pin from said keeper.

17. A fastener for removably clamping together an outer plate having a bearing and an inner plate comprising; a casing secured to said inner plate and having spaced inner and outer rims defining a channel, a normally expanded hollow rubber bumper occupying substantially the entire space of said channel and projecting above said inner rim, a keeper seated on said bumper and including cam means and an elongated slot, a bolt rotatably guided by said bearing and removably projectible within said inner rim and into and through said slot and having a cross pin cooperating with said cam means to shift said keeper against the resistance of said bumper to compress the latter upon rotation of said bolt to disengageably interlock said pin with said keeper, means for slidably and non-rotatably guiding said keeper, stop means to limit displacement of said keeper in a direction towards said bumper, and stop means to limit displacement of said keeper in a direction away from said bumper on expansion of the latter pursuant to unlocking of said pin from said keeper.

18. A fastener for removably clamping together an outer plate having a bearing and an inner plate comprising; a rim secured to said inner plate, a hollow rubber bumper confined within said rim, keeper means telescopically associated with said rim comprising a cap mounted on said bumper and carrying cam means and having an elongated slot and spaced grooved means merging with said slot, a bolt rotatably guided by said bearing and removably projectible within said rim and into and through said slot and cap and having a cross pin cooperating with said cam means to shift said keeper means against the resistance of said bumper to compress the latter upon rotation of said bolt to interlock said pin with said grooved means, said rim and cap having means for slidably and non-rotatably guiding said keeper means relative to said rim, stop means to limit displacement of said cap in a direction towards said bumper, and stop means to limit displacement of said keeper means in a direction away from said bumper on expansion of the latter pursuant to unlocking of said pin from said keeper means.

19. A fastener for removably clamping together an outer plate having a bearing and an inner plate comprising; a rim secured to said inner plate, a hollow rubber bumper confined within and having an end projecting beyond said rim, a cap mounted on said bumper, a keeper on said cap and including cam means, an elongated slot, and grooved means merging with said slot, a bolt rotatably guided by said bearing and removably projectible within said rim and into and through said slot and keeper and having a cross pin cooperating with said cam means to shift said keeper against the resistance of said bumper to compress the latter upon rotation of said bolt to removably interlock said pin with said grooved means, said rim and cap having means for slidably and non-rotatably guiding said cap relative to said rim, stop means to limit displacement of said cap in a direction towards said bumper, and stop means to limit displacement of said keeper in a direction away from said bumper on expansion of the latter pursuant to unlocking of said pin from said keeper.

20. In combination, a platform having an opening, a casing secured to said platform about said opening and comprising spaced inner and outer rims defining a channel, a rubber bumper confined in said channel and extending beyond said inner rim, keeper means mounted on said bumper, means for slidably and rectilinearly guiding said keeper means relative to said casing, a bolt removably and rotatably associated with said keeper means and having pin means for shifting said keeper means to compress said bumper, means to limit displacement of said keeper means in a direction towards said bumper, and a peripheral lip to limit displacement of said keeper means in a direction away from said bumper upon expansion of the latter pursuant to disengagement of said pin means from said keeper means.

JOHAN H. JOHNSON.
CHARLES M. PALMER.